United States Patent
Luo et al.

(10) Patent No.: US 12,160,772 B2
(45) Date of Patent: Dec. 3, 2024

(54) RESOURCE PATTERN INDICATION FROM DISTRIBUTED UNIT

(71) Applicant: QUALCOMM Incorporated, San Diego, CA (US)

(72) Inventors: Jianghong Luo, Skillman, NJ (US); Navid Abedini, Basking Ridge, NJ (US); Naeem Akl, Somerville, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/643,117

(22) Filed: Dec. 7, 2021

(65) Prior Publication Data
US 2023/0180060 A1 Jun. 8, 2023

(51) Int. Cl.
  *H04W 28/18* (2009.01)
  *H04W 52/02* (2009.01)
  *H04W 72/21* (2023.01)

(52) U.S. Cl.
  CPC ....... *H04W 28/18* (2013.01); *H04W 52/0203* (2013.01); *H04W 72/21* (2023.01)

(58) Field of Classification Search
  CPC . H04W 28/18; H04W 52/0203; H04W 72/21; H04W 52/0258; H04W 52/0277; H04W 52/0296; H04W 72/0453; H04W 72/20; H04W 40/22; H04W 88/085; Y02D 30/70
  See application file for complete search history.

(56) References Cited

U.S. PATENT DOCUMENTS

| 2019/0053193 | A1* | 2/2019 | Park | H04W 72/51 |
| 2019/0246420 | A1* | 8/2019 | Park | H04W 72/23 |
| 2019/0313433 | A1* | 10/2019 | Abedini | H04W 72/0446 |
| 2019/0349079 | A1* | 11/2019 | Novlan | H04B 7/15542 |

(Continued)

FOREIGN PATENT DOCUMENTS

| WO | 2020214401 A1 | 10/2020 |
| WO | 2020231534 A1 | 11/2020 |
| WO | 2021173328 A1 | 9/2021 |

OTHER PUBLICATIONS

Qualcomm Incorporated; "Resource Management in IAB Network"; 3GPP TSG RAN WG1 Meeting #95, R1-1813419, Spokane, US Nov. 12-16, 2018 (6 pages) (Year: 2018).*

(Continued)

*Primary Examiner* — Ayaz R Sheikh
*Assistant Examiner* — Tarell A Hampton
(74) *Attorney, Agent, or Firm* — Harrity & Harrity, LLP

(57) ABSTRACT

Various aspects of the present disclosure generally relate to wireless communication. In some aspects, a first node of a wireless network may transmit, by a first distributed unit (DU) of the first node to a central unit (CU), a second DU of another node in the wireless network, a user equipment in the wireless network, or a child node of the first node, an indication of a suggested resource pattern for the DU. The first node may transmit or receive a communication in the wireless network based at least in part on a resource pattern that is received in connection with transmitting the indication. Numerous other aspects are described.

30 Claims, 10 Drawing Sheets

(56) References Cited

U.S. PATENT DOCUMENTS

| | | | |
|---|---|---|---|
| 2019/0349180 A1* | 11/2019 | Lu | H04L 27/2607 |
| 2019/0363810 A1* | 11/2019 | Luo | H04J 11/0053 |
| 2019/0373627 A1* | 12/2019 | Luo | H04W 24/10 |
| 2020/0053745 A1* | 2/2020 | Luo | H04W 72/121 |
| 2020/0112953 A1* | 4/2020 | Bendlin | H04W 88/14 |
| 2020/0267756 A1* | 8/2020 | Fakoorian | H04W 56/001 |
| 2020/0351929 A1* | 11/2020 | Luo | H04W 72/1273 |
| 2020/0367064 A1* | 11/2020 | Barac | H04W 16/14 |
| 2021/0250941 A1* | 8/2021 | Tiirola | H04W 40/22 |
| 2021/0297998 A1* | 9/2021 | Choi | H04W 72/23 |
| 2021/0345369 A1* | 11/2021 | Teyeb | H04W 28/0278 |
| 2021/0352522 A1* | 11/2021 | Hwang | H04W 28/0278 |
| 2021/0368481 A1* | 11/2021 | Jo | H04W 72/21 |
| 2021/0400540 A1* | 12/2021 | Kim | H04W 72/23 |
| 2022/0053408 A1* | 2/2022 | Zhang | H04W 72/20 |
| 2022/0070679 A1* | 3/2022 | Harada | H04W 72/0453 |
| 2022/0166567 A1* | 5/2022 | Kurita | H04L 5/0094 |
| 2022/0167364 A1* | 5/2022 | Kurita | H04W 72/56 |
| 2022/0201656 A1* | 6/2022 | Kurita | H04W 74/0833 |
| 2022/0287050 A1* | 9/2022 | Korpi | H04L 5/0035 |
| 2022/0338192 A1* | 10/2022 | Kurita | H04B 7/15528 |
| 2023/0171745 A1* | 6/2023 | Ghanbarinejad | H04W 76/19 370/329 |

OTHER PUBLICATIONS

Huawei, HiSilicon; "Resource Multiplexing between backhaul and access in IAB"; 3GPP TSG RAN WG1 Meeting #97, R1-1906001; Reno, USA, May 13-17, 2019 (9 pages) (Year: 2019).*

3GPP TR 38.874 V16.0.0, "3rd Generation Partnership Project; Technical Specification Group Radio Access Network; NR; Study on Integrated Access and Backhaul; (Release 16); Dec. 2018 (111 Pages)" (Year: 2018).*

International Search Report and Written Opinion—PCT/US2022/078586—ISA/EPO—Apr. 12, 2023.

Partial International Search Report—PCT/US2022/078586—ISA/EPO—Feb. 17, 2023.

* cited by examiner

RESOURCE PATTERN INDICATION FROM DISTRIBUTED UNIT

FIELD OF THE DISCLOSURE

Aspects of the present disclosure generally relate to wireless communication and to techniques and apparatuses for indicating a resource pattern from a distributed unit of a node in a wireless network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first node of a wireless network. The wireless network may be any type of wireless network with distributed unit (DU) and central unit (CU) components, such as a radio access network or an integrated access and backhaul network. The method may include transmitting, by a first DU to a CU of the first node, a second DU of another node in the wireless network, a user equipment (UE) in the wireless network, or a child node of the first node, an indication of a suggested resource pattern for the DU. The method may include transmitting or receiving a communication in the wireless network based at least in part on a resource pattern that is received in connection with transmitting the indication.

Some aspects described herein relate to a method of wireless communication performed by a first node in a wireless network. The method may include receiving, from a parent node of the first node, an indication of one or more non-available (NA) resources in a serving cell for the first node. The method may include one or more of, cancelling a communication that is semi-statically or dynamically configured to use a resource in the one or more NA resources skipping a downlink measurement of a signal in a resource that overlaps with the one or more NA resources or extending an evaluation period for the downlink measurement of the signal.

Some aspects described herein relate to a first node of a wireless network for wireless communication. The first node may include a memory and one or more processors coupled to the memory. The one or more processors may be configured to transmit, by a first DU of the first node to a CU, a second DU of another node in the wireless network, a UE in the wireless network, or a child node of the first node, an indication of a suggested resource pattern for the DU. The one or more processors May be configured to transmit or receive a communication in the wireless network based at least in part on a resource pattern that is received in connection with transmitting the indication.

Some aspects described herein relate to a first node of a wireless network for wireless communication. The first node may include a memory and one or more processors coupled to the memory. The one or more processors may be configured to receive, from a parent node of the first node, an indication of one or more NA resources in a serving cell for the first node. The one or more processors may be configured to cancel a communication that is semi-statically or dynamically configured to use a resource in the one or more NA resources, skip a downlink measurement of a signal in a resource that overlaps with the one or more NA resources, or extend an evaluation period for the downlink measurement of the signal.

Some aspects described herein relate to a non-transitory computer-readable medium that stores a set of instructions for wireless communication by a first node of a wireless network. The set of instructions, when executed by one or more processors of the first node, may cause the first node to transmit, by a first DU of the first node to a CU, a second DU of another node in the wireless network, a UE in the wireless network, or a child node of the first node, an indication of a suggested resource pattern for the DU. The set of instructions, when executed by one or more processors of the first node, may cause the first node to transmit or receive a communication in the wireless network based at least in part on a resource pattern that is received in connection with transmitting the indication.

Some aspects described herein relate to a non-transitory computer-readable medium that stores a set of instructions for wireless communication by first node of a wireless network. The set of instructions, when executed by one or more processors of the first node, may cause the first node to cancel a communication that is semi-statically or dynamically configured to use a resource in the one or more NA resources. The set of instructions, when executed by one or more processors of the first node, may cause the first node to skip a downlink measurement of a signal in a resource that overlaps with the one or more NA resources. The set of instructions, when executed by one or more processors of the first node, may cause the first node to extend an evaluation period for the downlink measurement of the signal.

Some aspects described herein relate to an apparatus for wireless communication. The apparatus may include means for transmitting, by a first DU of the apparatus to a CU, a second DU of another apparatus, a UE, or a child node of the apparatus, an indication of a suggested resource pattern for the DU. The apparatus may include means for transmitting or receiving a communication based at least in part on a resource pattern that is received in connection with transmitting the indication.

Some aspects described herein relate to an apparatus for wireless communication. The apparatus may include means for receiving, from a parent node of the apparatus, an indication of one or more NA resources in a serving cell for the apparatus. The apparatus may include means for canceling a communication that is semi-statically or dynamically configured to use a resource in the one or more NA resources. The apparatus may include means for skipping a downlink measurement of a signal in a resource that overlaps with the one or more NA resources. The apparatus may include means for extending an evaluation period for the downlink measurement of the signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
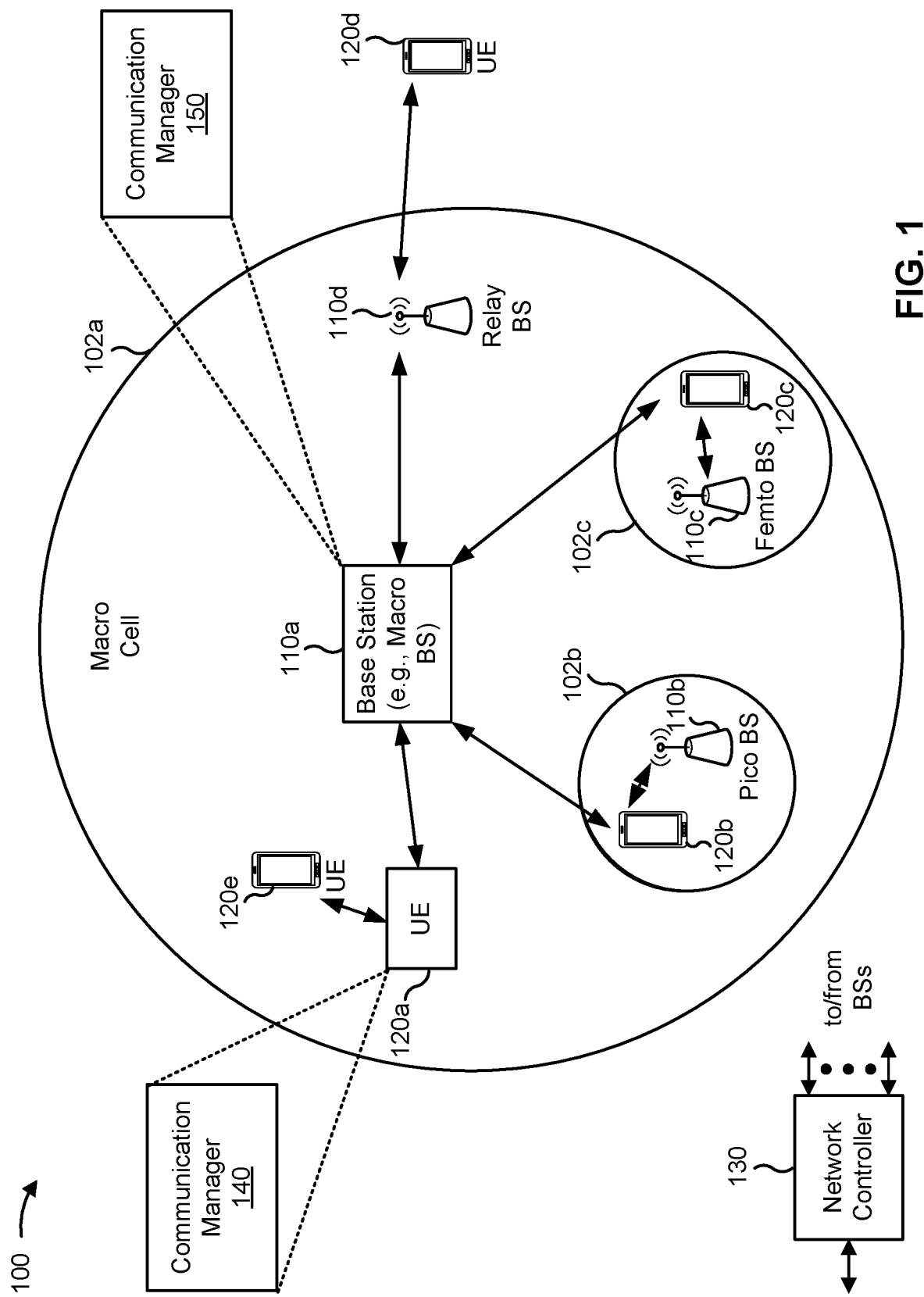
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHZ-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first node (e.g., base station 110) in a wireless network may include a communication manager 150. As described in more detail elsewhere herein, the communication manager 150 may transmit, by a first distributed unit (DU) of the first node to a central unit (CU), a second DU of another node in the wireless network, a UE in the wireless network, or a child node of the first node, an indication of a suggested resource pattern for the DU. The communication manager 150 may transmit or receiving a communication in the wireless network based at least in part on a resource pattern that is received in connection with transmitting the indication. Additionally, or alternatively, the communication manager 150 may perform one or more other operations described herein.

In some aspects, a first node (e.g., base station 110, a UE 120) may include a communication manager 140 or 150. As described in more detail elsewhere herein, the communication manager 140 or 150 may receive, from a parent node of the first node, an indication of one or more non-available (NA) resources in a serving cell for the first node. The communication manager 140 or 150 may cancel a communication that is semi-statically or dynamically configured to use a resource in the one or more NA resources, skip a downlink measurement of a signal in a resource that overlaps with the one or more NA resources, or extend an evaluation period for the downlink measurement of the signal. Additionally, or alternatively, the communication manager 140 or 150 may perform one or more other operations described herein.

As indicated above, FIG. 1 is provided as an example. Other examples may differ from what is described with regard to FIG. 1.

Figure 2:
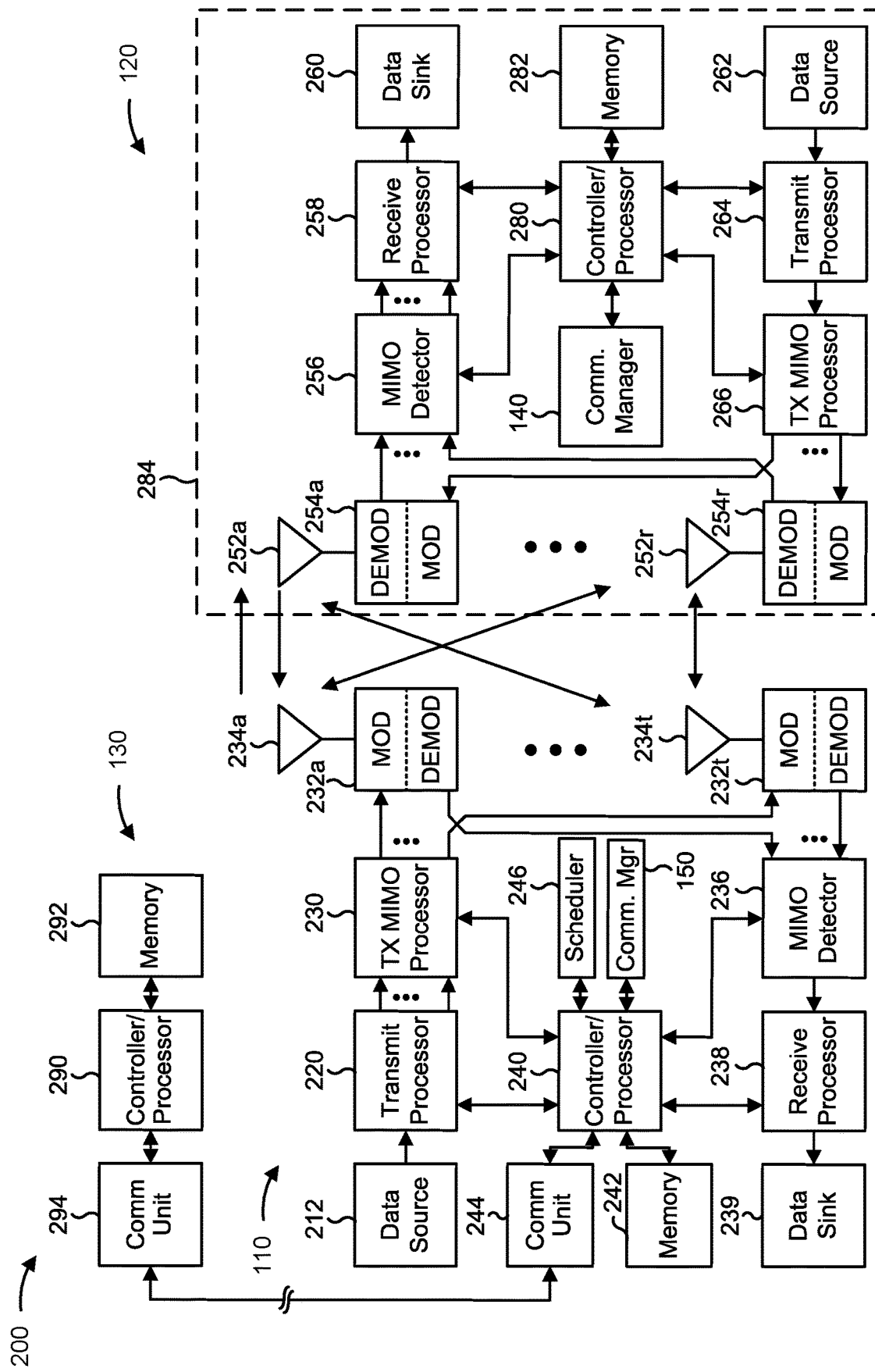
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., 7 modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, May provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with indicating a resource pattern from a DU of a wireless network, as described in more detail elsewhere herein. The wireless network may be a radio access network with gNBs and access UEs, an integrated access and backhaul (IAB) network with an IAB-donor, IAB-nodes and access UEs, or any other wireless network with DU and CU components. In some aspects, first node described herein is the base station 110, is included in the base station 110, or includes one or more components of the base station 110 shown in FIG. 2. In some aspects, the first node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first node (e.g., base station 110) of a wireless network includes means for transmitting, by a first DU of the first node to a CU, a second DU of another node in the wireless network, a UE in the wireless network, or a child node of the first node, an indication of a suggested resource pattern for the DU; and/or means for transmitting or receiving a communication in the wireless network based at least in part on a resource pattern that is received in connection with transmitting the indication. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first node (e.g., base station 110, a UE 120) includes receiving, from a parent node of the first node, an indication of one or more NA resources in a serving cell for the first node; and/or one or more of: means for cancelling a communication that is semi-statically or dynamically configured to use a resource in the one or more NA resources; means for skipping a downlink measurement of a signal in a resource that overlaps with the one or more NA resources; or means for extending an evaluation period for the downlink measurement of the signal. In some aspects, the means for the first node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
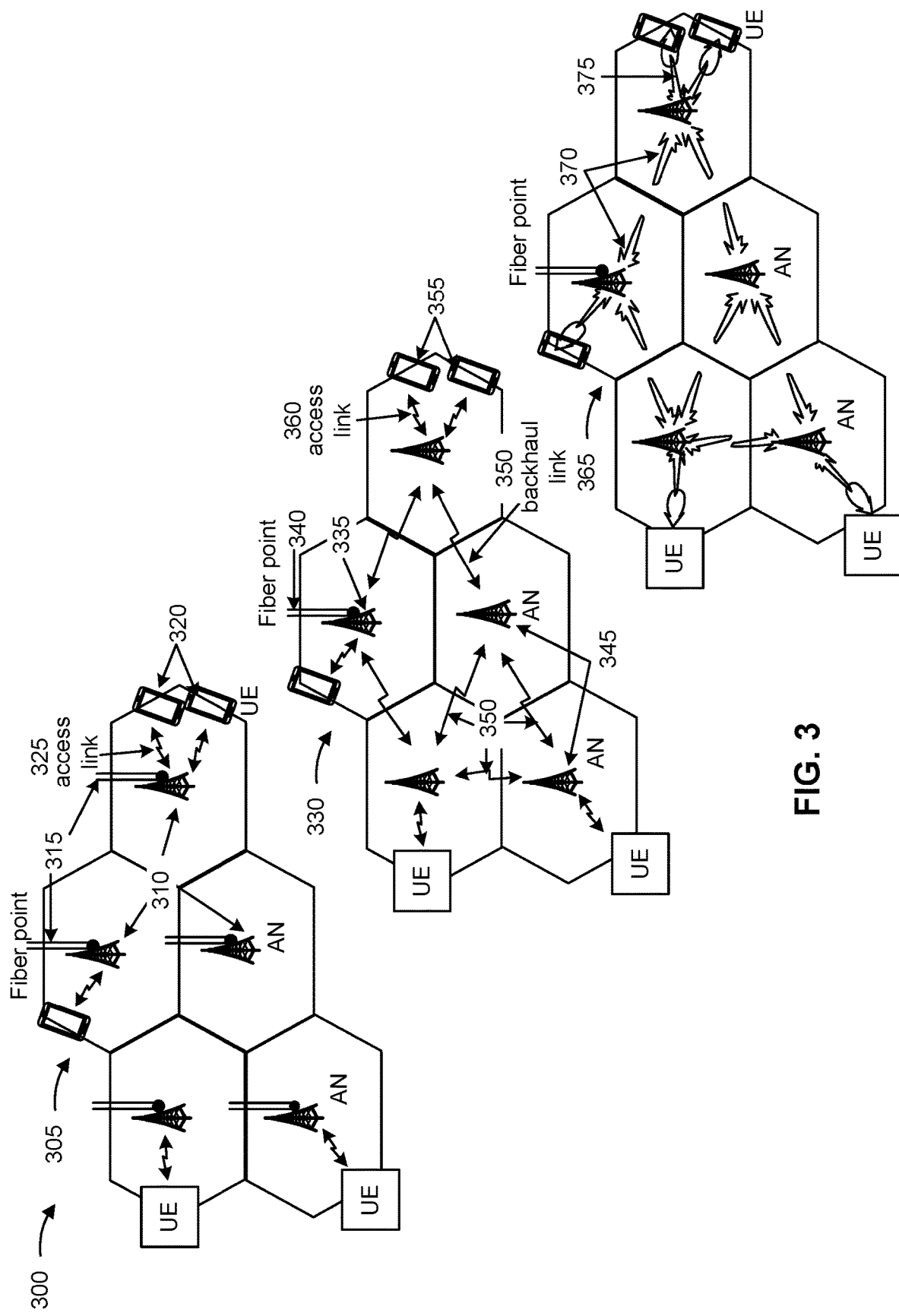
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

Some networks include base stations with split functionality between a controlling unit, such as a CU, and a radio access unit, such as a DU. One such radio access network may include an IAB network. As shown by reference number 330, the IAB network may be a wireless backhaul network. In the IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
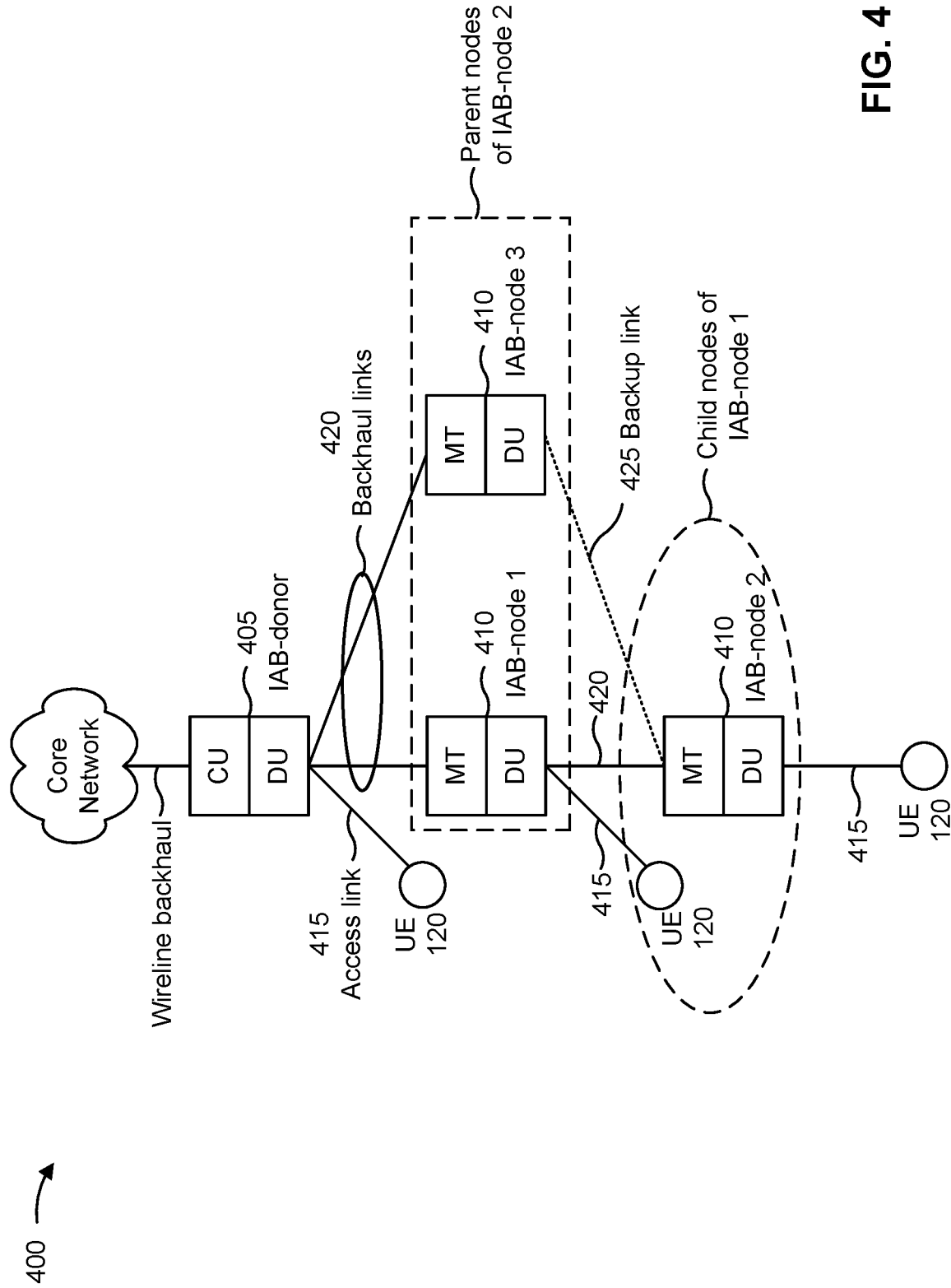
FIG. 4 is a diagram illustrating an example of an integrated access and backhaul network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message on an F1-C or F1-U interface).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. An IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

A CU of an IAB-donor or IAB-node may configure a resource pattern for a DU of the IAB-donor or IAB-node. The resource pattern may include time resources, frequency resources, and/or spatial resources that the DU is to use or is not to use. The resource pattern may also include time resources, frequency resources, and/or spatial resources that the DU is to use if a specified condition (e.g., traffic condition, signal condition, channel condition) is satisfied. Such resources may be categorized as hard resources (may be used regardless of an MT's configuration), soft resources (may be used based on explicit indication from parent node or implicit determination of no impact to MT's operation), or NA resources (DU cannot use the NA resources except for a set of specified cell-specific signals). The cell-specific signals may include a synchronization signal block (SSB), remaining minimum system information (RMSI) physical downlink control channel (PDCCH), a periodic channel state information reference signal (CSI-RS), or a scheduling request (SR).

As indicated above, FIG. 4 is provided as an example. Other examples may differ from what is described with regard to FIG. 4.

Figure 5:
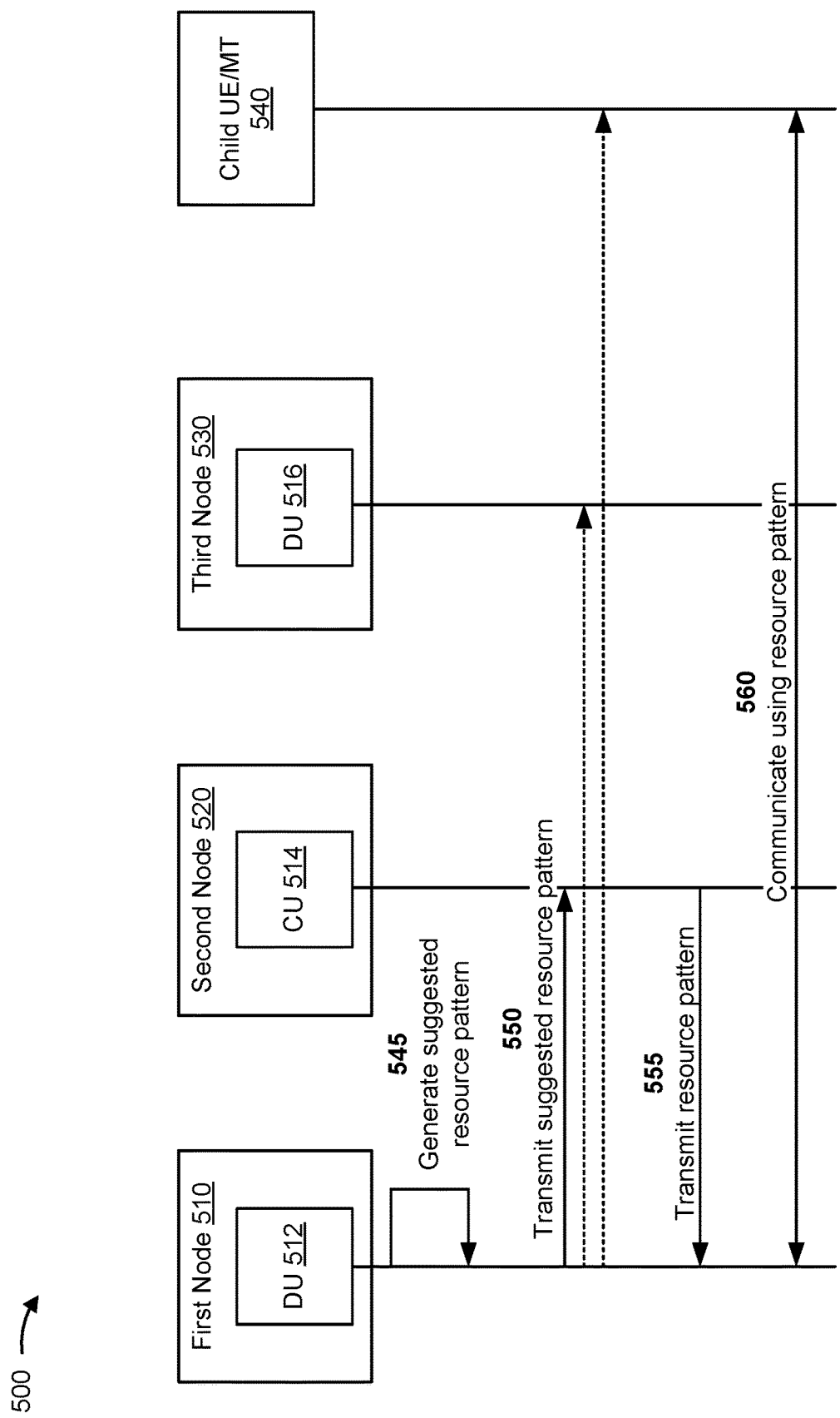
FIG. 5 is a diagram illustrating an example associated with a distributed unit indicating a suggested resource pattern, in accordance with the present disclosure.

FIG. 5 is a diagram illustrating an example 500 associated with a DU indicating a suggested resource pattern, in accordance with the present disclosure. Example 500 shows an example of a wireless network with split DU/CU functionality. The wireless network may be, for example, a radio access network that includes gNBs and access UEs, or an IAB network that includes an IAB-donor, IAB-nodes, and access UEs. As shown in FIG. 5, for an IAB-network, a first node 510 (e.g., IAB-donor 405, IAB-node 410) may include a first DU 512. Example 500 also shows a CU 514, and a second DU 516. The CU 514 may be in a second node 520 (e.g., an IAB-donor 405), and DU 516 may be in a third node 530 (e.g., IAB-donor 405, IAB-node 410). Example 500 also shows a child node, which may be a child UE/MT 540 (e.g., a UE 120, an MT in IAB-node 410). For a radio access network, the DU 512 and CU 514 in example 500 together may be a gNB (e.g. base station 110), second node 520 and third node 530 may be other gNBs (e.g. base station 110), and a child node may be a child UE (e.g., a UE 120).

A CU may configure a resource pattern for a DU to save energy. For example, NA resources may be used by a DU to enter a micro-sleep. Sleep patterns of multiple DUs can be coordinated by the CU to minimize the impact to served UEs. A CU may configure a resource pattern that is shared among multiple DU nodes by CUs via an F1-AP interface or an Xn interface. However, there is no signaling from a DU to a CU to request a desired or intended resource pattern. There is also no coordinated signaling for a resource pattern from a DU to other nodes, such as to child nodes or to other DUs via a Uu interface or a sidelink channel.

A DU may have more local information (e.g., traffic conditions, MT status, channel conditions, interference conditions) than a CU for configuring a desired resource pattern. According to various aspects described herein, the DU may transmit an indication of a suggested (desired or intended) resource pattern to the CU. The DU may generate the suggested resource pattern based at least in part on information local to the DU. The local information may include a type of energy source (e.g., alternating current (AC) power, battery, solar panel), a level of remaining energy, traffic conditions, MT status, channel conditions, interference conditions, or an uplink buffer status report (BSR). The CU may determine or negotiate a resource pattern for the DU based at least in part on the suggested resource pattern and resource usage information of other DUs. That is, the DU may provide information to assist the CU with coordinating resource patterns among DUs to save energy. Without the DU providing a suggested resource pattern to the CU, the CU may need to be provided with additional assistance information from other sources to determine a proper resource pattern for the DU. This additional assistance information would consume additional signaling resources.

In some aspects, a DU may observe some channel clearance failure patterns, such as when a Listen-Before-Talk (LBT) procedure fails for a time resource, a frequency resource, and/or a spatial resource. The DU may request a pattern of NA resources that align with observed LBT failure patterns, such that the DU has improved LBT success rates during available resources. The CU may be able to coordinate resource patterns to account for channel clearance failure patterns.

In some aspects, DUs may share semi-static hard, soft, or NA (H/S/NA) resource configuration information and frequency domain H/S/NA resource configuration information with the CU and neighboring DUs (e.g., neighboring IAB nodes and IAB-donor). The information may help the CU and other nodes to manage interference, such as crosslink interference (CLI), and to manage NR dual connectivity power coordination. The DU may share a slot configuration (e.g. intended time division duplexing (TDD) uplink (UL)-downlink (DL) configuration) of a serving DU cell with the CU. The DU may also transmit a suggested resource pattern (e.g., available resources, NA resources) to the CU to avoid interference from neighbor DU cells based at least in part on CLI measurements or reports from a served UE.

Example 500 shows DU 512 providing a suggested resource pattern to CU 514 and/or other entities. As shown by reference number 545, DU 512 may generate the suggested resource pattern. DU 512 may generate the suggested resource pattern based at least in part on a type of energy source, a level of remaining energy, a channel condition, a traffic condition, an interference condition, or an uplink buffer status report. DU 512 may generate the suggested resource pattern based at least in part on aligning NA resources with a channel sensing failure pattern. DU 512 may generate the suggested resource pattern based at least in part on interference or slot information for DU 512 or other DUs. For example, a slot format may have uplink slots next to downlink slots and the suggested resource pattern may use slots in a slot format pattern that are not conflicting or not adjacent to and interfering.

The suggested resource pattern may be specified per DU cell, per group of DU cells, per resource block (RB) group, per beam direction, per TRP, per link between the first node and the child node, per access link, and/or per backhaul link. For frequency domain resource patterns, DU 512 may provide a suggested RB group configuration.

In some aspects, DU 512 may generate the suggested resource pattern so as to not to conflict with resources of a resource pattern received from CU 514 or with other NA resources. That is, DU 512 may not be expected to suggest a non-complying resource pattern. DU 512 may not use some resources that are available to DU 512. Alternatively, DU 512 may generate the suggested resource pattern independent of (without regard to) a resource pattern (e.g., soft resources, NA resources) indicated by CU 514. This suggested resource pattern may be a non-complying pattern. Some resources may appear to conflict, but DU 512 will leave configuration decisions to CU 514 to determine the resource pattern for DU 512 based at least in part on other information that CU 514 may have regarding relevant resource usage.

As shown by reference number 550, DU 512 may transmit the suggested resource pattern. As shown in example 500, DU 512 may transmit the suggested resource pattern to CU 514 (e.g., via an F1-AP interface or an RRC message to a co-located MT) in second node 520. DU 512 may transmit the suggested resource pattern to DU 516, which may be in third node 530. Third node 530 may be an IAB parent node. Third node 530 may include one or more DUs. DU 512 may transmit the suggested resource pattern via a collated MT, an Uu interface, uplink control information (UCI) in a physical uplink control channel (PUCCH) or a physical uplink shared channel (PUSCH), or a medium access control control element (MAC CE). DU 512 may transmit the suggested resource pattern via over-the-air (OTA) signals or a sidelink channel. DU 512 may transmit the suggested resource pattern to the child UE/MT 540 via downlink control information (DCI) (including group-common PDCCH), a MAC CE, or an RRC message on a Uu interface.

As shown by reference number 555, CU 514 may transmit a resource pattern to DU 512, and the resource pattern may be based at least in part on the suggested resource pattern. That is, CU 514 may adopt, reject, or modify the suggested resource pattern from DU 512 based at least in part on information CU 514 may have about resources used by other DUs or entities. The resource pattern transmitted by CU 514 may be a response to the suggested resource pattern. If the suggested resource pattern complies with available resources, there may not be a response and DU 512 may proceed with using the suggested resource pattern for communications. If the suggested resource pattern does not comply in some way with resource information provided to DU 512, the suggested resource pattern may be considered a request that CU 514 May accept, reject, or modify with the resource pattern (transmitted at reference number 555) or another message.

As shown by reference number 560, DU 512 may communicate with another entity, such as the child UE/MT 540, using the resource pattern from CU 514. The communication may include transmitting or receiving a communication using available resources in the resource pattern and not using NA resources in the resource pattern.

As indicated above, FIG. 5 is provided as an example. Other examples may differ from what is described with respect to FIG. 5.

Figure 6:
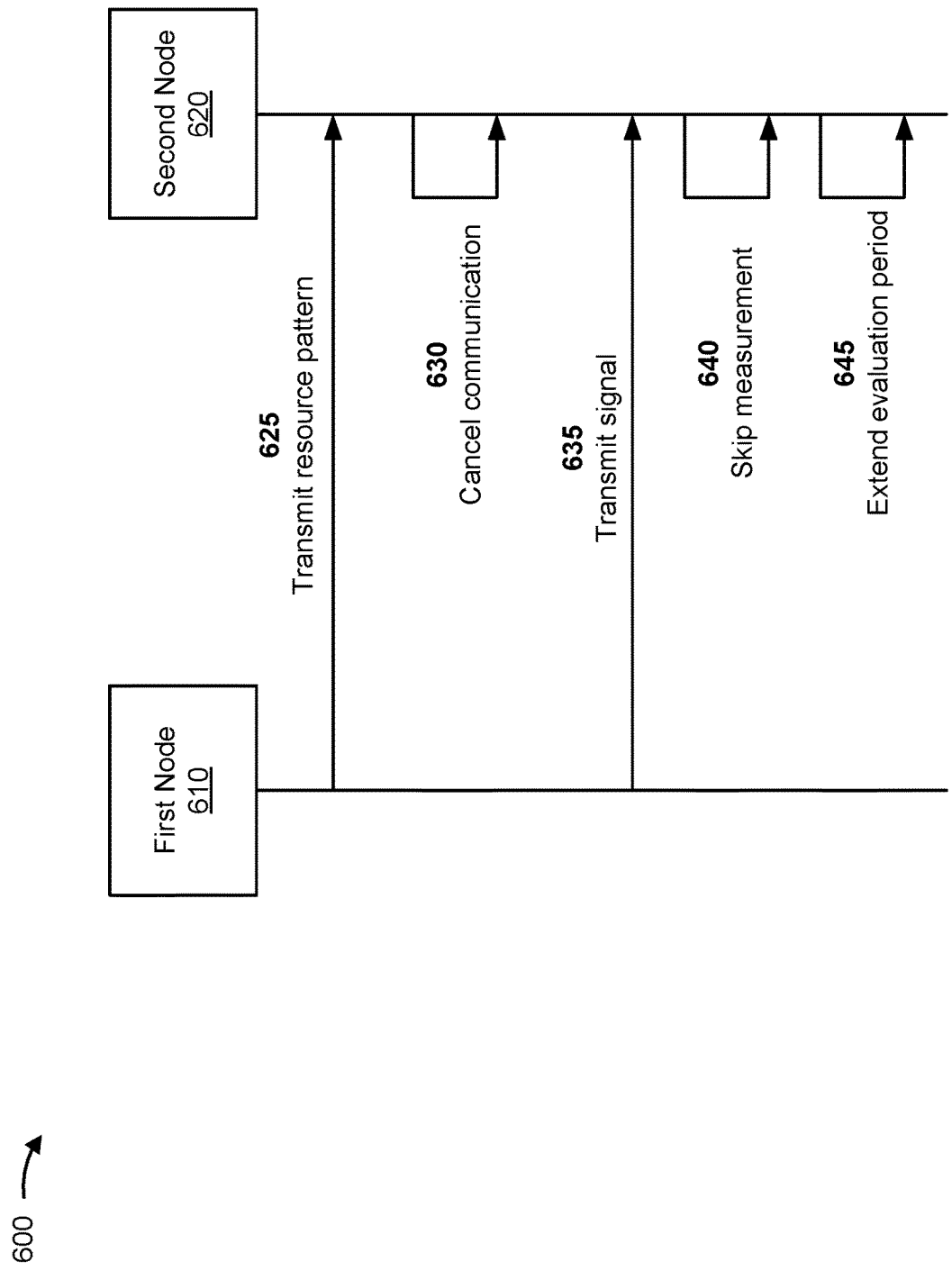
FIG. 6 is a diagram illustrating an example associated with using information about non-available resources, in accordance with the present disclosure.

FIG. 6 is a diagram illustrating an example 600 associated with using information about NA resources. As shown in FIG. 6, a first node 610 and a second node 620 may communicate with one another. The first node 610 may be a parent node in a wireless network (e.g., radio access network with gNBs, IAB network). The parent node may include a CU. The second node may be a child UE/MT or a DU.

As shown by reference number 625, the first node 610 may transmit a resource pattern to the second node 620. The resource pattern may include hard resources, soft resources, or NA resources of a serving cell for the first node 610. This may be similar to the resource pattern transmitted in FIG. 5 (reference number 545).

The second node 620 may use the information in the resource pattern to perform one or more of several operations. For example, as shown by reference number 630, the second node 620 may cancel a communication that is semi-statically or dynamically configured to use a resource in one or more NA resources indicated by the resource pattern. As shown by reference number 635, the first node 610 may transmit a signal to the second node 620. This signal may be a downlink reference signal to be measured for beam management or link failure/recovery management. As shown by reference number 640, the second node 620 may skip a downlink measurement of the signal in a resource that overlaps with the one or more NA resources. As shown by reference number 645, the second node 620 may extend an evaluation period for the downlink measurement of the signal. By adjusting to the resource pattern to better align with NA resources, the second node 620 may conserve processing resources, signaling resources, and power.

As indicated above, FIG. 6 is provided as an example. Other examples may differ from what is described with respect to FIG. 6.

Figure 7:
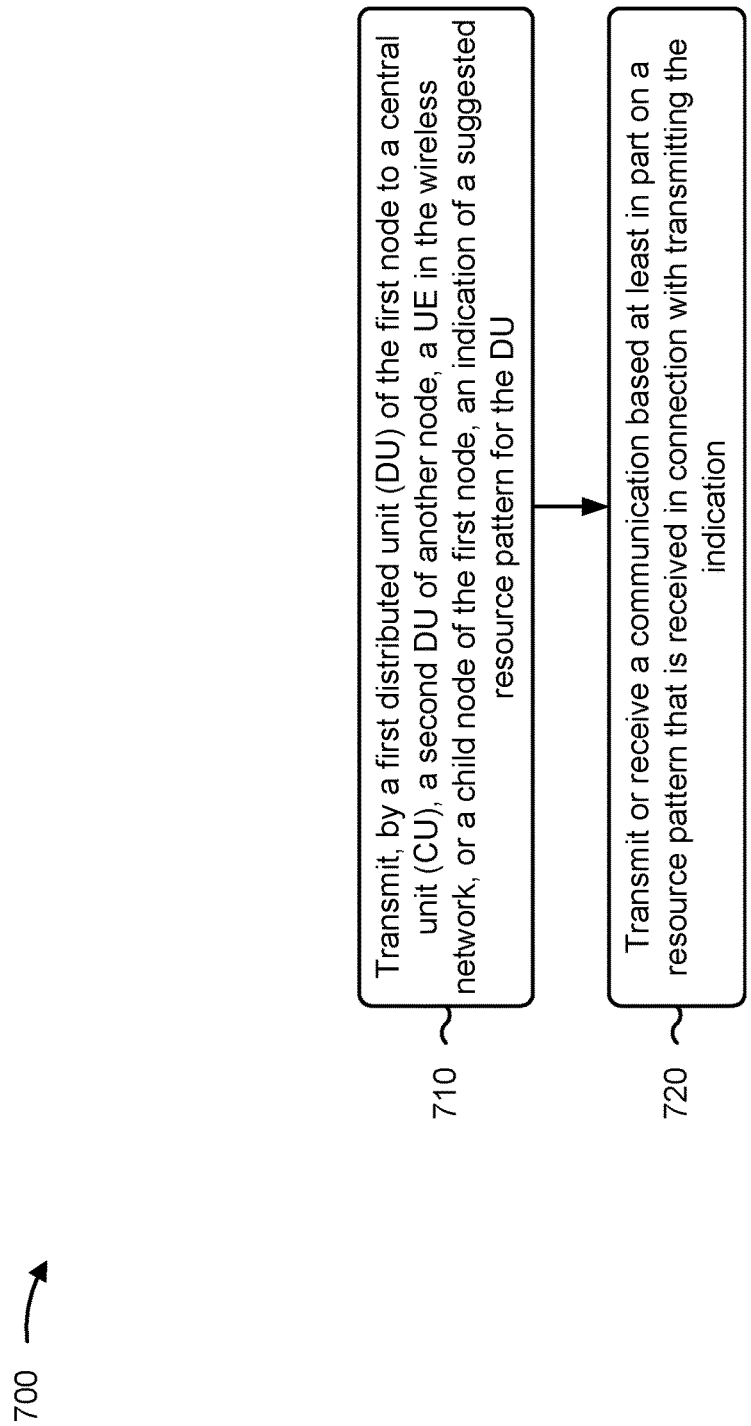
FIG. 7 is a diagram illustrating an example process performed, for example, by a first node, in accordance with the present disclosure.

FIG. 7 is a diagram illustrating an example process 700 performed, for example, by a first node in a wireless network, in accordance with the present disclosure. The first node may be a gNB, an IAB-node (with an MT and a DU) or an IAB-donor node (with a CU and one or more DUs). Example process 700 is an example where the first node (e.g., base station 110, first node 510) performs operations associated with a DU indicating a resource pattern.

As shown in FIG. 7, in some aspects, process 700 may include transmitting, by a first DU of the first node to a CU, a second DU of another node in the wireless network, a UE in the wireless network, or a child node of the first node, an indication of a suggested resource pattern for the DU (block 710). For example, the first node (e.g., using communication manager 150 and/or transmission component 904 depicted in FIG. 9) may transmit, by a first DU of the first node to a CU, a second DU of another node in the wireless network, a UE in the wireless network, or a child node of the first node, an indication of a suggested resource pattern for the DU, as described above in connection with FIGS. 3-5.

As further shown in FIG. 7, in some aspects, process 700 may include transmitting or receiving a communication in the wireless network based at least in part on a resource pattern that is received in connection with transmitting the indication (block 720). For example, the first node (e.g., using communication manager 150 and/or transmission component 904 depicted in FIG. 9) may transmit or receive a communication in the wireless network based at least in part on a resource pattern that is received in connection with transmitting the indication, as described above in connection with FIGS. 3-5.

Process 700 may include additional aspects, such as any single aspect or any combination of aspects described below and/or in connection with one or more other processes described elsewhere herein.

In a first aspect, process 700 includes generating the suggested resource pattern to conserve power based at least in part on one or more of a type of energy source, a level of remaining energy, a channel condition, a traffic condition, an interference condition, or an uplink BSR.

In a second aspect, alone or in combination with the first aspect, process 700 includes generating the suggested resource pattern based at least in part on aligning NA resources with a channel sensing failure pattern.

In a third aspect, alone or in combination with one or more of the first and second aspects, process 700 includes generating the suggested resource pattern based at least in part on interference or slot information for other DUs.

In a fourth aspect, alone or in combination with one or more of the first through third aspects, the suggested resource pattern indicates one or more of a resource the DU is to use, a resource the DU is to not use, or a resource that is to be used based at least in part on a condition being satisfied.

In a fifth aspect, alone or in combination with one or more of the first through fourth aspects, the suggested resource pattern is specified for a DU cell, a group of DU cells, an RB group, a beam direction, a TRP, a link between the first node and the child node, an access link, or a backhaul link.

In a sixth aspect, alone or in combination with one or more of the first through fifth aspects, the suggested resource pattern includes a frequency domain resource pattern and an RB group configuration.

In a seventh aspect, alone or in combination with one or more of the first through sixth aspects, transmitting the indication of the suggested resource pattern includes transmitting the indication to the CU via an F1-AP interface or in an RRC message via an MT of the first node.

In an eighth aspect, alone or in combination with one or more of the first through seventh aspects, process 700 includes receiving a response from the CU after transmitting the indication of the suggested resource pattern to the CU, where transmitting or receiving the communication includes transmitting or receiving the communication based at least in part on the response.

In a ninth aspect, alone or in combination with one or more of the first through eighth aspects, transmitting the indication of the suggested resource pattern includes transmitting the indication to the child node via DCI, a MAC CE, an RRC message, or an SIB message.

In a tenth aspect, alone or in combination with one or more of the first through ninth aspects, transmitting the indication of the suggested resource pattern includes transmitting the indication to a parent node of the first node via UCI in a PUCCH, UCI in a PUSCH, or a MAC CE.

In an eleventh aspect, alone or in combination with one or more of the first through tenth aspects, transmitting the indication of the suggested resource pattern includes transmitting the indication to the DU of the other node via an OTA signal or a sidelink communication.

In a twelfth aspect, alone or in combination with one or more of the first through eleventh aspects, process 700 includes generating the suggested resource pattern such that resources of the suggested resource pattern do not conflict with resources of a resource pattern received from the CU.

In a thirteenth aspect, alone or in combination with one or more of the first through twelfth aspects, process 700 includes generating the suggested resource pattern independent of whether resources of the suggested resource pattern conflict with resources of a resource pattern received from the CU.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
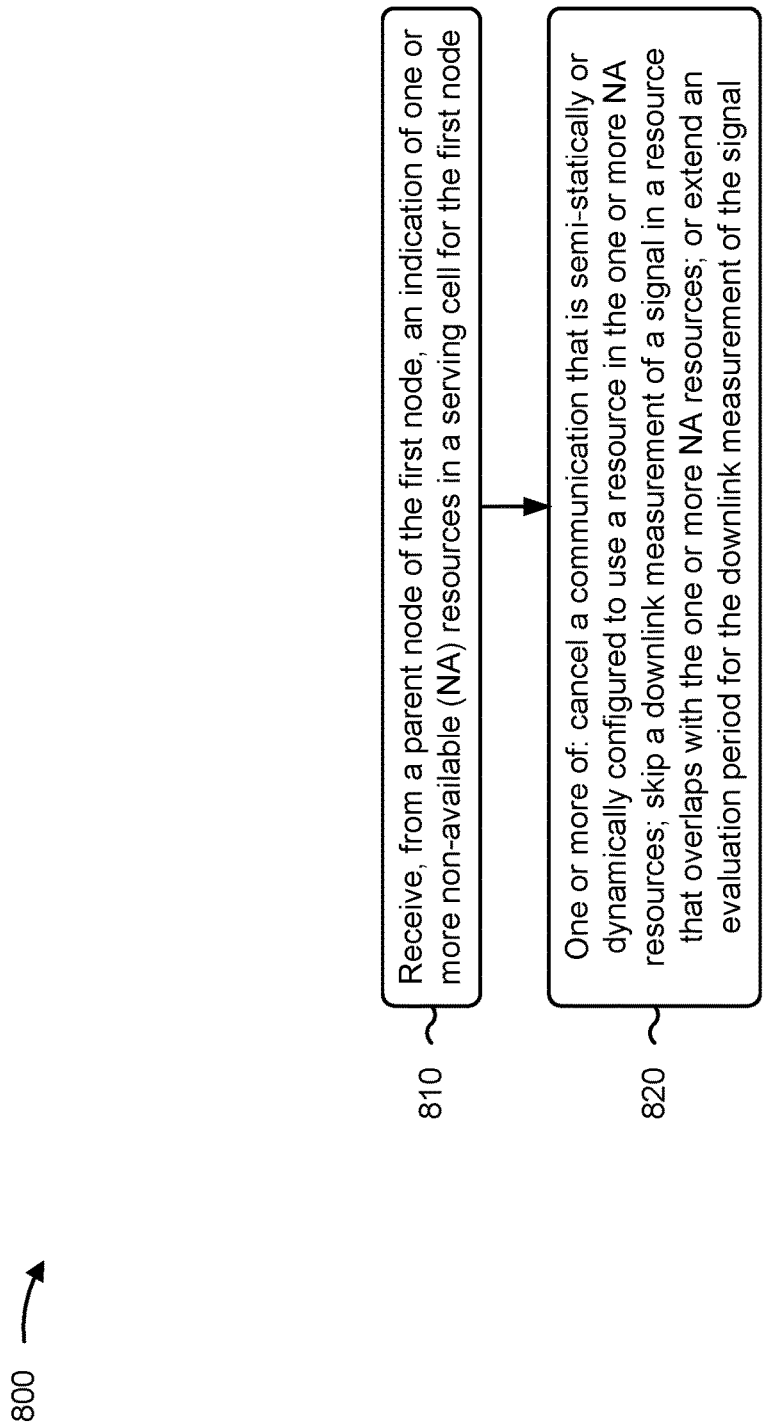
FIG. 8 is a diagram illustrating an example process performed, for example, by a first node, in accordance with the present disclosure.

FIG. 8 is a diagram illustrating an example process 800 performed, for example, by a first node in a wireless network, in accordance with the present disclosure. Example process 800 is an example where the first node (e.g., base station 110, a UE 120, first node 610) performs operations associated with an indication of a NA resources.

As shown in FIG. 8, in some aspects, process 800 may include receiving, from a parent node of the first node, an indication of one or more NA resources in a serving cell for the first node (block 810). For example, the first node (e.g., using communication manager 140 or 150 and/or reception component 1002 depicted in FIG. 10) may receive, from a parent node of the first node, an indication of one or more NA resources in a serving cell for the first node, as described above in connection with FIGS. 3-6.

As further shown in FIG. 8, in some aspects, process 800 may include one or more of: cancelling a communication that is semi-statically or dynamically configured to use a resource in the one or more NA resources; skipping a downlink measurement of a signal in a resource that overlaps with the one or more NA resources; or extending an evaluation period for the downlink measurement of the signal (block 820). For example, the first node (e.g., using communication manager 140 or 150 and/or resource usage component 1008 depicted in FIG. 10) may one or more of: cancelling a communication that is semi-statically or dynamically configured to use a resource in the one or more NA resources; skipping a downlink measurement of a signal in a resource that overlaps with the one or more NA resources; or extending an evaluation period for the downlink measurement of the signal, as described above in connection with FIGS. 3-6.

Process 800 may include additional aspects, such as any single aspect or any combination of aspects described below and/or in connection with one or more other processes described elsewhere herein.

In a first aspect, the first node is a UE in the wireless network. The first node may also be an IAB-node in an IAB network.

In a second aspect, alone or in combination with the first aspect, receiving the indication includes receiving the indication by a DU of the first node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
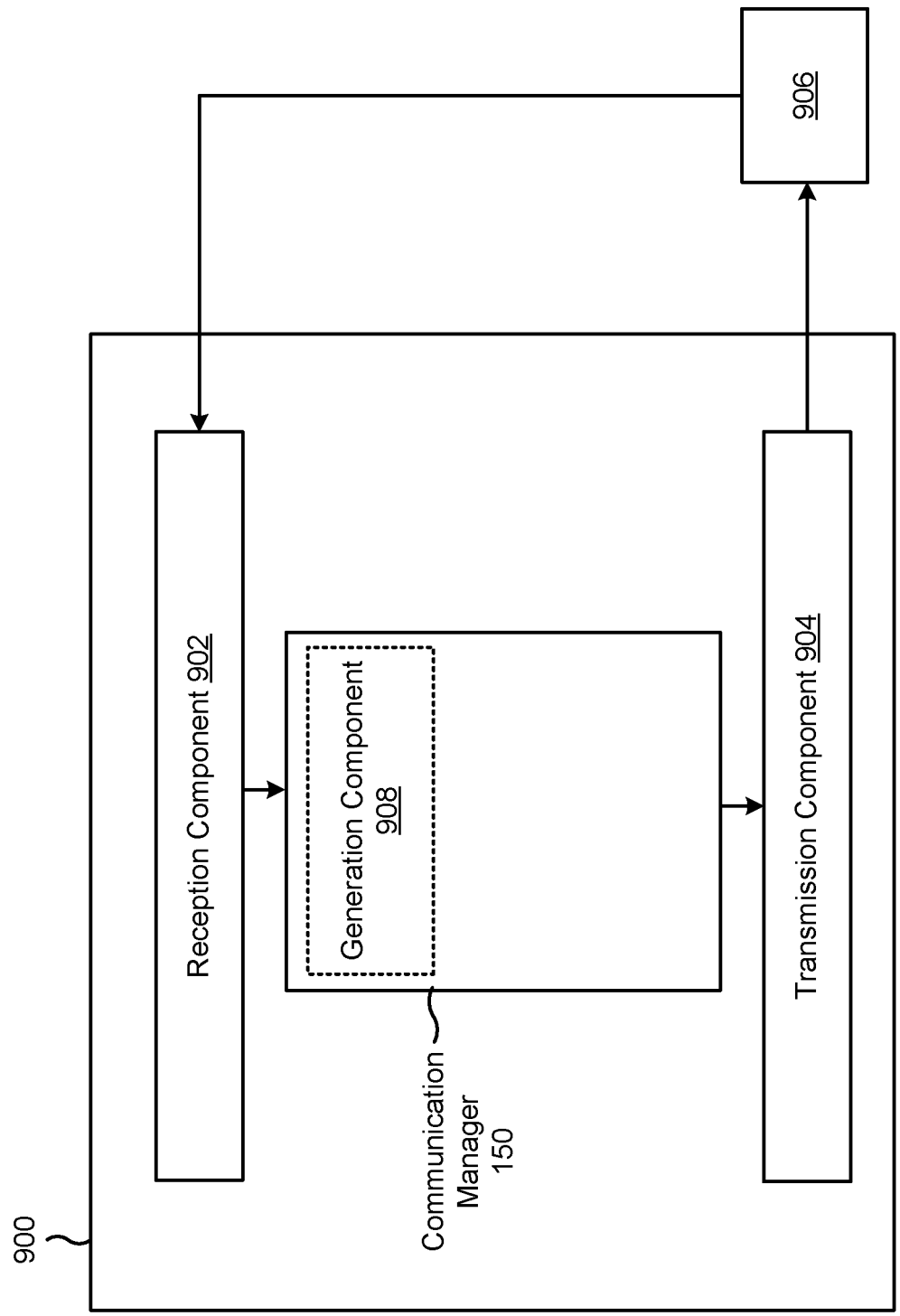
FIGS. 9-10 are diagrams of example apparatuses for wireless communication, in accordance with the present disclosure.

FIG. 9 is a diagram of an example apparatus 900 for wireless communication. The apparatus 900 may be a first node (e.g., base station 110, first node 510) in a wireless network, or a first node may include the apparatus 900. For example, the first node may be a gNB, an IAB-node (with an MT and a DU), or an IAB-donor node (with a CU and one or more DUs). In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a generation component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first node described in connection with FIG. 2. In some aspects, the transmission component 904 may be co-located with the reception component 902 in a transceiver.

The transmission component 904 may transmit, by a first DU of the first node to a CU, a second DU of another node in the wireless network, a UE in the wireless network, or a child node of the first node, an indication of a suggested resource pattern for the DU. The transmission component 904 may transmit or receive a communication in the wireless network based at least in part on a resource pattern that is received in connection with transmitting the indication.

The generation component 908 may generate the suggested resource pattern to conserve power based at least in part on one or more of a type of energy source, a level of remaining energy, a channel condition, a traffic condition, an interference condition, or an uplink buffer status report. The generation component 908 may generate the suggested resource pattern based at least in part on aligning non-available resources with a channel sensing failure pattern. The generation component 908 may generate the suggested resource pattern based at least in part on interference or slot information for other DUs.

The reception component 902 may receive a response from the CU after transmitting the indication of the suggested resource pattern to the CU, where transmitting or receiving the communication includes transmitting or receiving the communication based at least in part on the response.

The generation component 908 may generate the suggested resource pattern such that resources of the suggested resource pattern do not conflict with resources of a resource pattern received from the CU. The generation component 908 may generate the suggested resource pattern independent of whether resources of the suggested resource pattern conflict with resources of a resource pattern received from the CU.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
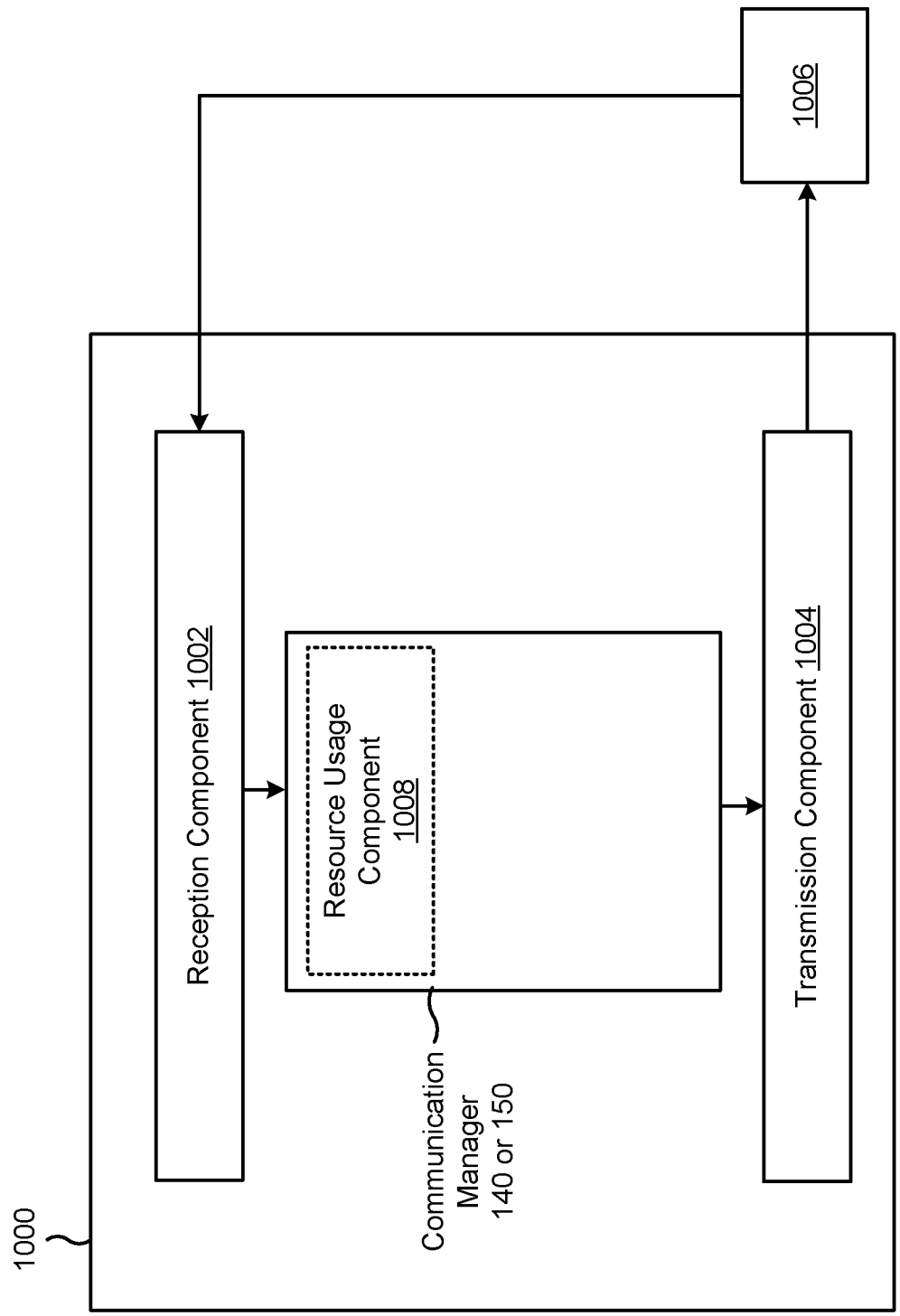

FIG. 10 is a diagram of an example apparatus 1000 for wireless communication. The apparatus 1000 may be a first node (e.g., first node 610, base station 110, a UE 120) in a wireless network, or a first node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140 or 150. The communication manager 140 or 150 may include a resource usage component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first node described in connection with FIG. 2. In some aspects, the transmission component 1004 may be co-located with the reception component 1002 in a transceiver.

The reception component 1002 may receive, from a parent node of the first node, an indication of one or more NA resources in a serving cell for the first node. The resource usage component 1008 may cancel a communication that is semi-statically or dynamically configured to use a resource in the one or more NA resources, skip a downlink measurement of a signal in a resource that overlaps with the one or more NA resources, or extend an evaluation period for the downlink measurement of the signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first node of a wireless network, comprising: transmitting, by a first distributed unit (DU) of the first node to a central unit (CU), a second DU of another node in the wireless network, a user equipment in the wireless network, or a child node of the first node, an indication of a suggested resource pattern for the DU; and transmitting or receiving a communication in the wireless network based at least in part on a resource pattern that is received in connection with transmitting the indication.

Aspect 2: The method of Aspect 1, further comprising generating the suggested resource pattern to conserve power based at least in part on one or more of a type of energy source, a level of remaining energy, a channel condition, a traffic condition, an interference condition, or an uplink buffer status report.

Aspect 3: The method of Aspect 1 or 2, further comprising generating the suggested resource pattern based at least in part on aligning non-available resources with a channel sensing failure pattern.

Aspect 4: The method of any of Aspects 1-3, further comprising generating the suggested resource pattern based at least in part on interference or slot information for other DUs.

Aspect 5: The method of any of Aspects 1-4, wherein the suggested resource pattern indicates one or more of: a resource the DU is to use, a resource the DU is to not use, or a resource that is to be used based at least in part on a condition being satisfied.

Aspect 6: The method of any of Aspects 1-5, wherein the suggested resource pattern is specified for a DU cell, a group of DU cells, a resource block (RB) group, a beam direction, a transmit receive point (TRP), a link between the first node and the child node, an access link, or a backhaul link.

Aspect 7: The method of Aspect 6, wherein the suggested resource pattern includes a frequency domain resource pattern and an RB group configuration.

Aspect 8: The method of any of Aspects 1-7, wherein transmitting the indication of the suggested resource pattern includes transmitting the indication to the CU via an F1 application protocol interface or in a radio resource control (RRC) message via a mobile termination (MT) of the first node.

Aspect 9: The method of Aspect 8, further comprising receiving a response from the CU after transmitting the indication of the suggested resource pattern to the CU, wherein transmitting or receiving the communication includes transmitting or receiving the communication based at least in part on the response.

Aspect 10: The method of any of Aspects 1-9, wherein transmitting the indication of the suggested resource pattern includes transmitting the indication to the child node via downlink control information (DCI), a media access control control element (MAC CE), a radio resource control (RRC) message, or a system information block (SIB) message.

Aspect 11: The method of any of Aspects 1-10, wherein transmitting the indication of the suggested resource pattern includes transmitting the indication to a parent node of the first node via uplink control information (UCI) in a physical uplink control channel (PUCCH), UCI in a physical uplink shared channel (PUSCH), or a media access control control element (MAC CE).

Aspect 12: The method of any of Aspects 1-11, wherein transmitting the indication of the suggested resource pattern includes transmitting the indication to the DU of the other node via an over-the-air (OTA) signal or a sidelink communication.

Aspect 13: The method of any of Aspects 1-12, further comprising generating the suggested resource pattern such that resources of the suggested resource pattern do not conflict with resources of a resource pattern received from the CU.

Aspect 14: The method of any of Aspects 1-13, further comprising generating the suggested resource pattern independent of whether resources of the suggested resource pattern conflict with resources of a resource pattern received from the CU.

Aspect 15: A method of wireless communication performed by a first node in a wireless network, comprising: receiving, from a parent node of the first node, an indication of one or more non-available (NA) resources in a serving cell for the first node; and one or more of: cancelling a communication that is semi-statically or dynamically configured to use a resource in the one or more NA resources; skipping a downlink measurement of a signal in a resource that overlaps with the one or more NA resources; or extending an evaluation period for the downlink measurement of the signal.

Aspect 16: The method of Aspect 15, wherein the first node is a UE in the wireless network.

Aspect 17: The method of Aspect 15, wherein receiving the indication includes receiving the indication by a distributed unit of the first node.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first node for wireless communication, comprising:
    memory; and
    one or more processors, coupled to the memory, configured to:
        transmit, by a first distributed unit (DU) of the first node to a central unit (CU), a second DU of another node, a user equipment, or a child node of the first node, an indication of a suggested resource pattern for the DU,
            wherein the suggested resource pattern for the DU is based at least in part on aligning non-available resources with a channel sensing failure pattern or based at least in part on interference or slot information for other DUs; and
        transmit or receive a communication based at least in part on a resource pattern that is received in connection with transmitting the indication.

2. The first node of claim 1, wherein the one or more processors are configured to generate the suggested resource pattern to conserve power based at least in part on one or more of a type of energy source, a level of remaining energy, a channel condition, a traffic condition, an interference condition, or an uplink buffer status report.

3. The first node of claim 1, wherein the one or more processors are configured to generate the suggested resource pattern based at least in part on aligning the non-available resources with the channel sensing failure pattern.

4. The first node of claim 1, wherein the one or more processors are configured to generate the suggested resource pattern based at least in part on the interference or the slot information for the other DUs.

5. The first node of claim 1, wherein the suggested resource pattern indicates one or more of: a resource the DU is to use, a resource the DU is to not use, or a resource that is to be used based at least in part on a condition being satisfied.

6. The first node of claim 1, wherein the suggested resource pattern is specified for a DU cell, a group of DU cells, a resource block (RB) group, a beam direction, a transmit receive point (TRP), a link between the first node and the child node, an access link, or a backhaul link.

7. The first node of claim 6, wherein the suggested resource pattern includes a frequency domain resource pattern and an RB group configuration.

8. The first node of claim 1, wherein the one or more processors, to transmit the indication of the suggested resource pattern, are configured to transmit the indication to the CU via an F1 application protocol interface or in a radio resource control (RRC) message via a mobile termination (MT) of the first node.

9. The first node of claim 8, wherein the one or more processors are configured to receive a response from the CU after transmitting the indication of the suggested resource pattern to the CU, and wherein the one or more processors, to transmit or receive the communication, are configured to transmit or receive the communication based at least in part on the response.

10. The first node of claim 1, wherein the one or more processors, to transmit the indication of the suggested resource pattern, are configured to transmit the indication to the child node via downlink control information (DCI), a media access control control element (MAC CE), a radio resource control (RRC) message, or a system information block (SIB) message.

11. The first node of claim 1, wherein the one or more processors, to transmit the indication of the suggested resource pattern, are configured to transmit the indication to a parent node of the first node via uplink control information (UCI) in a physical uplink control channel (PUCCH), UCI in a physical uplink shared channel (PUSCH), or a media access control control element (MAC CE).

12. The first node of claim 1, wherein the one or more processors, to transmit the indication of the suggested resource pattern, are configured to transmit the indication to the DU of the other node via an over-the-air (OTA) signal or a sidelink communication.

13. The first node of claim 1, wherein the one or more processors are configured to generate the suggested resource pattern such that resources of the suggested resource pattern do not conflict with resources of a resource pattern received from the CU.

14. The first node of claim 1, wherein the one or more processors are configured to generate the suggested resource pattern independent of whether resources of the suggested resource pattern conflict with resources of a resource pattern received from the CU.

15. A first node for wireless communication, comprising:
   memory; and
   one or more processors, coupled to the memory, configured to:
      transmit, to a parent node of the first node or a distributed unit of a second node, an indication of a first resource pattern for a distributed unit of the first node;
      transmit or receive an indication of one or more non-available (NA) resources in a serving cell for the first node based at least in part on a second resource pattern that corresponds to the indication of the first resource pattern; and
      one or more of:
         cancel a communication that is semi-statically or dynamically configured to use a resource indicated by the second resource pattern;
         skip a downlink measurement of a signal in a resource that overlaps with the one or more NA resources; or
         extend an evaluation period for the downlink measurement of the signal.

16. The first node of claim 15, wherein the first node is a user equipment.

17. The first node of claim 15, wherein the one or more processors, to receive the indication, are configured to receive the indication by a distributed unit of the first node or by a mobile termination of the first node.

18. A method of wireless communication performed by a first node of a wireless network, comprising:
   transmitting, by a first distributed unit (DU) of the first node to a central unit (CU), a second DU of another node in the wireless network, a user equipment in the wireless network, or a child node of the first node, an indication of a suggested resource pattern for the DU, wherein the suggested resource pattern for the DU is
      based at least in part on aligning non-available resources with a channel sensing failure pattern or based at least in part on interference or slot information for other DUs; and
   transmitting or receiving a communication in the wireless network based at least in part on a resource pattern that is received in connection with transmitting the indication.

19. The method of claim 18, further comprising generating the suggested resource pattern to conserve power based at least in part on one or more of a type of energy source, a level of remaining energy, a channel condition, a traffic condition, an interference condition, or an uplink buffer status report.

20. The method of claim 18, further comprising generating the suggested resource pattern based at least in part on aligning the non-available resources with the channel sensing failure pattern or based at least in part on the interference or the slot information for the other DUs.

21. The method of claim 18, wherein transmitting the indication of the suggested resource pattern includes transmitting the indication to the CU via an F1 application protocol interface or in a radio resource control (RRC) message via a mobile termination (MT) of the first node.

22. The method of claim 21, further comprising receiving a response from the CU after transmitting the indication of the suggested resource pattern to the CU, wherein transmitting or receiving the communication includes transmitting or receiving the communication based at least in part on the response.

23. The method of claim 18, wherein transmitting the indication of the suggested resource pattern includes transmitting the indication to the child node via downlink control information (DCI), a media access control control element (MAC CE), a radio resource control (RRC) message, or a system information block (SIB) message.

24. The method of claim 18, wherein transmitting the indication of the suggested resource pattern includes transmitting the indication to a parent node of the first node via uplink control information (UCI) in a physical uplink control channel (PUCCH), UCI in a physical uplink shared channel (PUSCH), or a media access control control element (MAC CE).

25. The method of claim 18, wherein transmitting the indication of the suggested resource pattern includes transmitting the indication to the DU of the other node via an over-the-air (OTA) signal or a sidelink communication.

26. The method of claim 18, further comprising generating the suggested resource pattern such that resources of the suggested resource pattern do not conflict with resources of a resource pattern received from the CU.

27. The method of claim 18, further comprising generating the suggested resource pattern independent of whether resources of the suggested resource pattern conflict with resources of a resource pattern received from the CU.

28. A method of wireless communication performed by a first node in a wireless network, comprising:
   transmitting, to a parent node of the first node or a distributed unit of a second node, an indication of a first resource pattern for a distributed unit of the first node;
   transmitting or receiving an indication of one or more non-available (NA) resources in a serving cell for the first node based at least in part on a second resource pattern that corresponds to the indication of the first resource pattern; and
   one or more of:
      cancelling a communication that is semi-statically or dynamically configured to use a resource indicated by the second resource pattern;
      skipping a downlink measurement of a signal in a resource that overlaps with the one or more NA resources; or
      extending an evaluation period for the downlink measurement of the signal.

29. The method of claim 28, wherein the first node is a user equipment in the wireless network.

30. The method of claim 28, wherein the first resource pattern comprises a suggested resource pattern that is based at least in part on aligning the one or more non-available (NA) resources with a channel sensing failure pattern.

* * * * *